United States Patent
Webb

[15] 3,698,376
[45] Oct. 17, 1972

[54] PORTABLE COOKING STOVE
[72] Inventor: Louis R. Webb, 1108 Batey Drive, Nashville, Tenn. 37204
[22] Filed: July 6, 1971
[21] Appl. No.: 159,794

[52] U.S. Cl. .............................. 126/9 R, 126/25 A
[51] Int. Cl. ............................................... F24c 1/16
[58] Field of Search ................... 126/9 R, 25 R, 25 A

[56] References Cited

UNITED STATES PATENTS

| 1,096,739 | 5/1914 | Moats | 126/9 R |
| 2,244,935 | 6/1941 | Binger | 126/9 R |
| 2,424,665 | 7/1947 | Pope, Sr. | 126/25 R X |
| 2,659,360 | 11/1953 | Bitney | 126/25 A |
| 2,826,984 | 3/1958 | Krull | 126/25 R X |
| 2,912,972 | 11/1959 | Leyen | 126/25 R |

Primary Examiner—Charles J. Myhre
Attorney—Harrington A. Lackey

[57] ABSTRACT

A portable cooking stove including a cooking chamber having interior removable side guide panels. The assembled guide panels have opposed parallel pairs of slide rails adapted to receive food receptacles or fuel receptacles having opposite side portions or flanges slidably engaging the rails. The slide panels are also provided with longitudinal rod guide members, preferably tubular, for removably receiving elongated rods, which are also received through aligned holes or openings in the front and rear walls of the chamber.

The stove also preferably includes front, back, side, top and bottom walls hinged together for collapsing into a dis-assembled position for storage or transportation.

10 Claims, 7 Drawing Figures

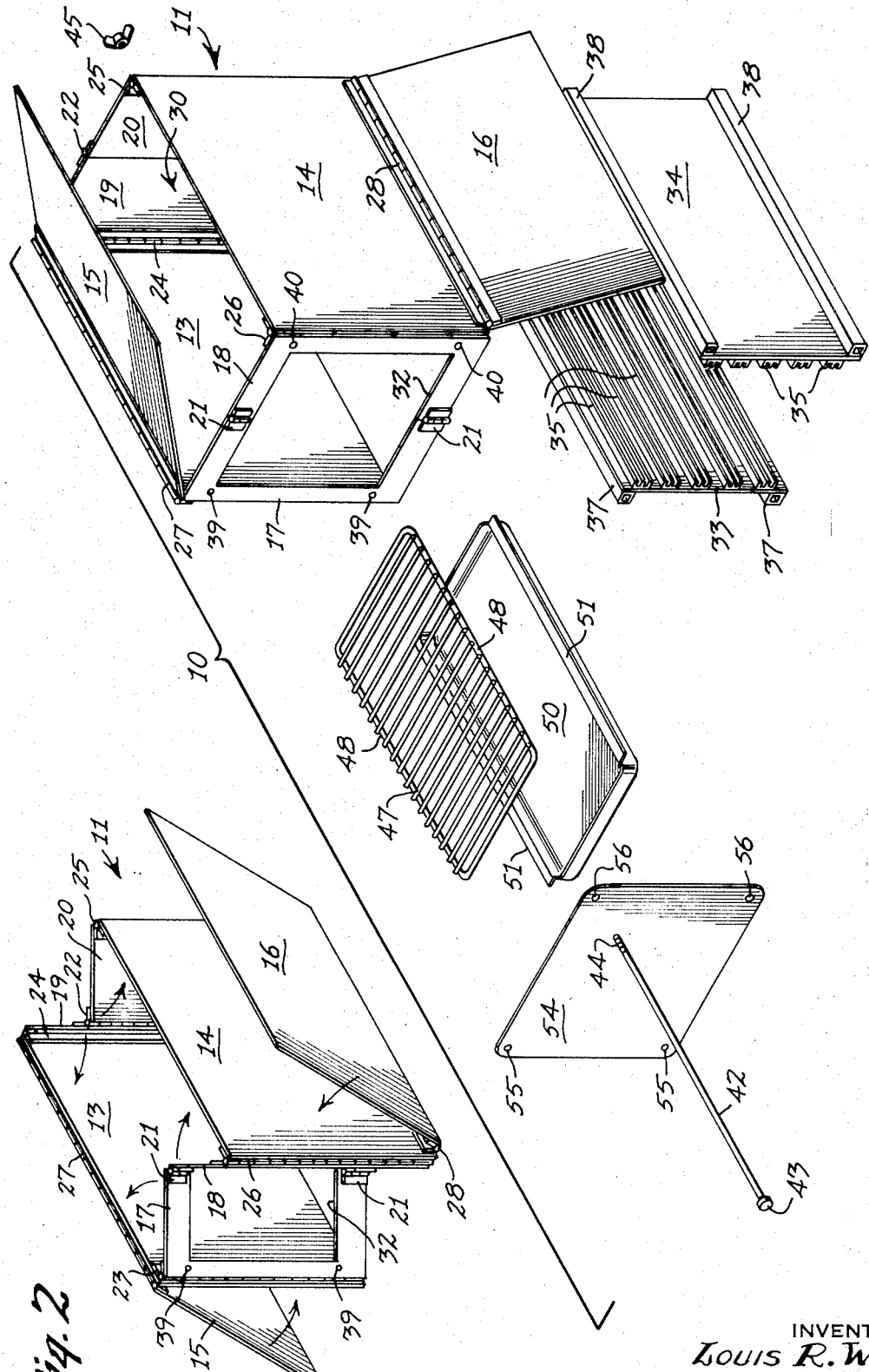

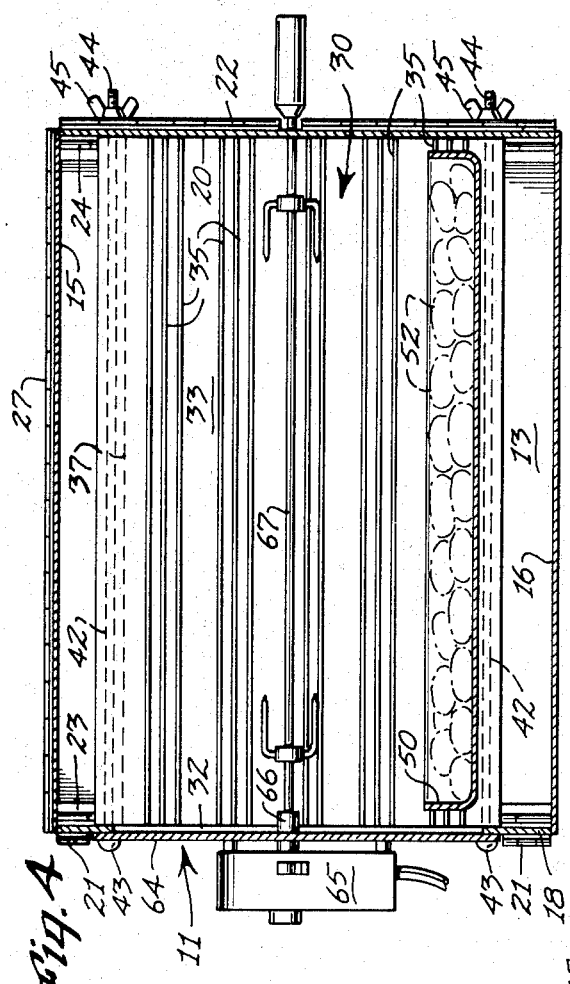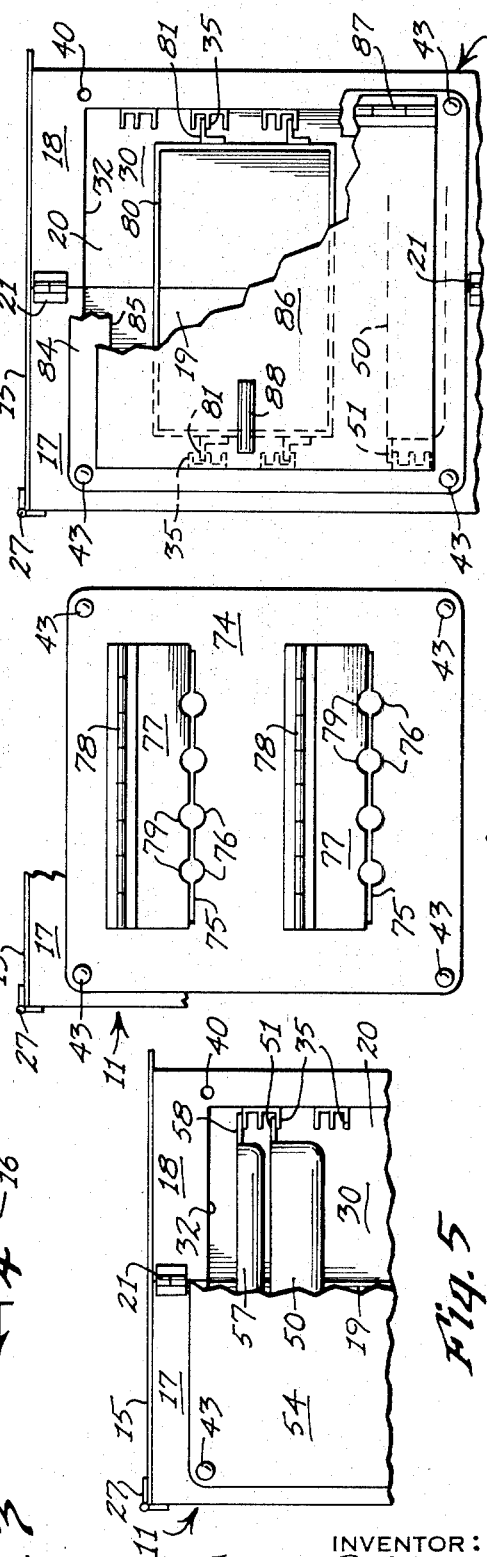

PORTABLE COOKING STOVE

BACKGROUND OF THE INVENTION

This invention relates to a cooking stove, and particularly to a portable cooking stove.

Portable cooking stoves of many types are known in the art. Among such prior art stoves are those which are adapted to use charcoal as a fuel for cooking food on vertically adjustable racks or grills. Portable stoves having opposed slide rails for receiving food racks in varying elevations from the fuel source are known. Moreover, portable cooking or camp stoves which have collapsible walls for minimizing transportation and storage space are also known.

A camp stove having vertically split, hinged end walls which are also hinged to side walls for collapsible movement are shown in U.S. Pat. No. 2,244,935, issued to Binger on June 10, 1941.

SUMMARY OF THE INVENTION

A portable cooking stove made in accordance with this invention is basically a box-shaped structure including front, rear, side, top and bottom walls.

Disposed within the cooking chamber formed by the walls is a pair of removable side guide panels, which, when assembled, are disposed parallel to each other and parallel and spaced from the opposed side walls. The interior faces of the guide panels have a plurality of vertically spaced, horizontally opposed, slide rails for receiving one or more food receptacles of different types and a fuel receptacle. The food and fuel receptacles have opposite side edge portions or flanges adapted to slidably engage the side rails for insertion, removal and vertical adjustment within the cooking chamber. The front wall has an opening of a width equal to the width of the food and fuel receptacles, or, in other words, approximately equal to the width of the spacing between the side guide panels. The side guide panels are removably supported by elongated rods extending through aligned guide openings in the front and rear walls of the stove and also through tubular guide members on the side panels. By removing the rods, the side panels may be disassembled and removed from the oven chamber to facilitate cleaning and storage.

The spaced location of the guide panels within the chamber also provides substantial insulation in the space between the side panels and the side walls. Such insulation will not only utilize the heat from the fuel more efficiently, but will also reduce the temperature of the side walls, not only to facilitate handling, but also to prolong the life of the side walls.

Another advantage of this invention is that various types of food receptacles and supports may be received within the cooking chamber. Various types of front covers may be employed to close the opening to the oven chamber and also to accommodate the various types of food supports, such as spits.

The walls of the oven chamber are also preferably hinged to permit collapsing of the walls after removal of the guide panels, and food and fuel receptacles, for compact storage and transportation.

BRIEF DESCRIPTION OF THE DRAWINGS

FIG. 1 is an exploded perspective view of one form of cooking stove made in accordance with this invention;

FIG. 2 is a perspective view of the housing of the stove disclosed in FIG. 1 in a partially collapsed position;

FIG. 3 is a front elevation, partially broken away, disclosing the cooking stove of FIG. 1, with a modified front cover, in assembled position;

FIG. 4 is a section taken along the line 4—4 of FIG. 3;

FIG. 5 is a fragmentary front elevation, partially broken away, of the cooking stove of FIG. 1, disclosing a modified food receptacle;

FIG. 6 is a fragmentary front elevation of the cooking stove of FIG. 1, having a second modified front cover; and FIG. 7 is a fragmentary front elevation, partially broken away, disclosing the cooking stove of FIG. 1, with a third modified front cover and another modified food receptacle.

DESCRIPTION OF THE PREFERRED EMBODIMENT

Referring now to the drawings in more detail, the portable camp stove 10 made in accordance with this invention comprises a housing 11 having side walls 13 and 14, top wall or cover 15 and bottom wall 16. The housing 11 also includes a front wall preferably split along its vertical center line to comprise front wall sections 17 and 18. The housing 11 also has a rear wall preferably split along its vertical center line to comprise rear wall sections 19 and 20.

The front wall sections 17 and 18 are joined together by external front hinges 21, which permit the front wall sections 17 and 18 to swing inward about a vertical axis. Likewise, the rear wall sections 19 and 20 are joined together by an external hinge 22 to permit the rear wall sections 19 and 20 to fold inward about a vertical axis.

The side edge of front wall section 17 is pivotally joined to the front edge of side wall 13 by the internal corner hinge 23. Corner hinge 24 pivotally joins the rear edge of side wall 13 to the rear panel section 19. In a similar manner, internal corner hinge 25 pivotally joins the side edge of rear wall section 20 to the rear edge of side wall 14; while internal corner hinge 26 pivotally connects the front edge of side wall 14 to the side edge of front wall section 18.

The top edge of side wall 13 is pivotally joined to one side edge of the top wall cover 15 by horizontal external hinge 27. Pivotally joined to the bottom edge of the other side wall 14 by the external horizontal hinge 28 is the bottom wall 16.

Thus, by observing FIGS. 1 and 2, it will be seen that various hinges 21 – 28 permit the walls 13 – 20 to be swung or pivoted to an assembled box-shaped housing 11 defining an oven chamber 30.

On the other hand, the housing 11 may be collapsed for compactness in storage and transportation, as disclosed in FIG. 2. The top wall 15 is swung up about the hinge 27 and then down against the exterior face of the side wall 13. The bottom wall 16 is swung down about its hinge 28 and then up against the exterior face of the opposite side wall 14. The front wall sections 17 and 18 and the rear wall sections 19 and 20 are then folded inward about the front and rear hinges 21 and 22, causing the side walls 13 and 14 to collapse about the internal corner hinges 23, 24, 25 and 26.

Formed in the front wall sections 17 and 18 is a front opening 32 which is rectangular in shape in its assembled position as disclosed in FIG. 1.

The stove 10 also includes a pair of rectangular shaped, side guide panels 33 and 34, each of which is a mirror image of the other. The side panels 33 and 34 are provided with elongated rails 35 which are parallel and vertically spaced on their interior faces. When the side panels 33 and 34 are properly assembled within the housing 11, the opposing guide rails 35 on the interior faces of both side panels 33 and 34 are not only parallel but horizontal.

In order to assemble the side guide panels 33 and 34 within the assembled housing 11, elongated straight tubular rod guides or guide members 37 are formed horizontally on the exterior face of the side panel 33, while similar tubular guide members 38 are formed on the exterior face of the guide panel 34. Formed in the front wall sections 17 and 18 for longitudinal alignment with the tubular guide members 37 and 38 are rod guide holes 39 and 40. Identical holes to the guide holes 39 and 40 are formed in the rear wall sections 19 and 20, not shown, in horizontal or longitudinal alignment with the guide holes 39 and 40. The length of the side panels 33 and 34 is approximately equal to the length of the cooking chamber 30, or in other words, equal to the longitudinal spacing between the front wall sections 17 and 18 and the rear wall sections 19 and 20 in assembled position. The height of the side guide panels 33 and 34 is slightly less than the height of the side walls 13 and 14.

In assembling the side panels 33 and 34, they may be inserted through the top of the housing 11 by raising the top wall 15, or through the bottom by lowering the bottom wall 16. Each side panel 33 and 34 might also be diagonally inserted through the front opening 32 until it is completely contained within the cooking chamber 30. After the tubular guide members 37 are aligned with the guide holes 39, guide rods, such as guide rod 42, are inserted through the aligned guide holes 39, tubular guide members 37 and the aligned guide holes, not shown, in the rear wall section 19. In a similar manner, side panel 34 is inserted until the tubular guide members 38 are aligned with the guide holes 40, and additional guide rods 42 are inserted through the aligned holes 40 and guide members 38.

Each guide rod 42 must be longer than the length of the housing 11 in assembled position so that it will extend through both the front guide holes 39 or 40 and the aligned rear noles, not shown. Preferably, each guide rod 42 has a head 43 on one end and has its opposite end 44 threaded for receiving a fastener, such as wing nut 45. The assembly of the rods 42 and the side panel 33 is best disclosed in FIG. 4.

Adapted to be slidably received upon horizontally opposed pairs of rails 35 are food receptacles, such as a rectangular rack 47 having opposed longitudinal side edge portions 48 of rod-like construction, to be slidably received upon the rails 35.

Adapted to be received at a lower level within the cooking chamber 30, is a fuel receptacle 50 having opposed longitudinal, parallel, coplanar side flanges 41, also adapted to slidably rest upon the side rails 35. The particular fuel receptacle 50 is a shallow tray or pan adapted to receive charcoal blocks 52, illustrated in Fig. 4. The fuel receptacle 50 is preferably inserted along the lower rails 35 so that it will occupy a position in the bottom of the cooking chamber 30, as illustrated in FIG. 4. Then the food receptacle, such as the grill or broiler rack 47, may be inserted at any desired level above the fuel receptacle 50 by slidably moving the side rod portions 48 along the guide rails 35 at the appropriate elevation, for the desired degree of cooking.

After the fuel receptacle 50 and food receptacle 47 are inserted in their desired elevations between the side panels 33 and 34, a front cover panel 54 may be assembled to cover the front opening 32 in order to more efficiently contain the heat from the fuel within the cooking chamber 30. The front cover panel 54 is also preferably square or rectangular and of a size slightly larger than the front opening 32. Formed in the corners of the front cover panel 54 are guide rod holes 55 and 56, which have the same spacing as the rod holes 39 and 40. Accordingly, two of the guide rods 42 may be inserted through the respective aligned holes 55 and 39, the tubular guide members 37 and the corresponding rear guide holes. The other two guide rods 42 are inserted through the aligned guide holes 56 and 40, guide members 38 and corresponding rear guide holes. Therefore, the front cover panel 54 is assembled simultaneously with the guide panels 33 and 34 and the housing 11, as best disclosed in FIGS. 1 and 5.

After the fuel receptacle 50, rack 47, and front cover panel 54 are assembled, the cooking of the food on the rack 47 may be observed by opening the top cover 15. After the food is cooked, then it may be removed from the top of the housing 11 by opening the top cover 15. If no front cover panel 54 is employed, then food may be removed by sliding the rack 47 forward through the opening 32.

In any event, after cooking is completed and the food is removed, the entire stove 10 may be disassembled by loosening the wing nuts 45, and removing the guide rods 42. The front cover panel 54, if used, the food receptacle 47, the fuel receptacle 50 and the side panels 33 and 34 automatically become separated. The fuel, such as the charcoal blocks 52, may be allowed to cool in the receptacle 50, or they may be dumped into another receptacle or on the ground for cooling so that the fuel receptacle 50 may be cleaned. Since the food receptacle 40, fuel receptacle 50, and side panels 33 and 34 are adapted to be completely separated and removed from the stove 10, they may be more easily cleaned. Since the top wall 15 and bottom wall 16 are hingedly connected to the side walls 13 and 14, not only the top and bottom walls 15 and 16 may easily be cleaned on both sides, but the interior housing 11 is more accessible for cleaning. After all of the parts are cleaned, the walls of the housing 11 are collapsed in the manner disclosed in Fig. 2, and the other elements of the stove 10, such as grill rack 47, fuel receptacle 50 and side panels 33 and 34, which are also substantially flat, may all be stacked against the bottom wall 16 or top wall 15 so that the entire stove is arranged in a completely compact package for storage or transportation.

FIG. 3 discloses a stove 10 in which the simple front cover panel 54 has been replaced by a front cover panel 64 of the same dimensions and with the same rod guide holes. However, mounted upon the front cover panel 64 is an electric motor 65 having a driven socket coupling 66 (FIG. 4) to which is fitted a rotary spit 67. The spit 67 is journaled in a corresponding hole, not shown, in the rear wall sections 19 and 20 for driven rotary movement within the cooking chamber 30 and above the burning charcoal blocks 52 in the fuel receptacle 50.

FIG. 3 also discloses a grill rack 47 in phantom mounted above the rotary spit 67, which can be used simultaneously or optionally with the spit 67.

FIG. 5 discloses a food receptacle in the form of a fry pan 57, having side flanges 58 for slidable support upon rails 35.

FIG. 6 discloses another type of front cover panel 74 of identical exterior shape and having the same rod guide holes as cover panel 54, for assembly to cover the opening 32. However, front cover panel 74 is provided with a pair of horizontally disposed rectangular openings with semi-circular notches 76 formed on the bottom edges thereof. Closing the openings 75 are flaps 77 hinged at their upper edges by hinges 78, and provided along their lower edges with semi-circular openings 79 which register with the openings 76 to form complete circular openings for receiving elongated spits, not shown, preferably for cooking kebob dishes. Otherwise, the front cover panel 74 is assembled by the rods 42 to cover the front opening 32 in the same manner as the front cover panel 54.

FIG. 7 discloses another type of food receptacle in the form of an enclosed bake oven 80 having opposed side flanges 81 adapted to slidably engage the rails 35. The front cover panel 84 is identical in size to the front cover panel 54 having the same rod guide holes for assembly to cover the front opening 32. However, the front cover panel 84 is essentially a rectangular door frame defining another door opening 85 covered by an oven door 86 pivotally secured by the vertical hinge 87 and provided with a handle 88 for closing the door 86.

In the modification of FIG. 7, the opening 85 may be made wide enough to permit the oven 80 to be inserted through the opening 85 to slidably engage the rails 35. The burner, or fuel receptacle 50 is also inserted through the opening 85 to fit within the bottom of the cooking chamber 30 and provide heat for the bake oven 80. After the bake oven 80 and fuel receptacle 50 are inserted, within the chamber 30, the door 86 is swung about the hinge 87 to close the opening 85.

It is therefore apparent that a portable cooking stove has been provided which can be made of light-weight, durable materials to form substantially flat components to facilitate compact stacking, and also to facilitate disassembly and separation of the elements for more effective cleaning. The stove 10 is also adapted with slight modifications in the food receptacles and the front cover panels to provide a great variety of cooking procedures including broiling, baking, frying and barbequing foods of various kinds and sizes.

Where a particular type of food or meat is being cooked within the chamber 30 upon a rotary spit 57, and more space is required, the side panels 33 and 34 could be removed to enlarge the cooking space, and the fuel receptacle 50 could be placed upon the bottom wall 16, or upon the ground to provide the necessary heat.

The ability of the top wall 15 and bottom wall 16 to swing toward and away from closed positions permits varying degrees of cooking. When it is desired to contain practically all of the heat within the housing 11, the walls 15 and 16 are closed. For cooking when greater draft or observation is required, the walls 15 and 16 are swung to their open positions.

The spacing of the side guide panels 33 and 34 from the sidewalls 13 and 14 provides insulation for efficient utilization of heat within the cooking chamber 30, and also permits cooler side walls 13 and 14.

What is claimed is:

1. A cooking stove comprising:
   a. a front frame,
   b. a rear frame,
   c. first and second side guide panels adapted to extend in longitudinal front-to-rear directions between said front and rear frames,
   d. each guide panel having an interior face, and elongated parallel rails on said interior face,
   e. longitudinal rod guide means on each of said panels,
   f. laterally spaced rod guide openings in said front and rear frames corresponding to the rod guide means for each of said panels, and adapted to be aligned with the rod guide means of each of said panels,
   g. at least one elongated rod for each side panel and longer than each side panel,
   h. means removably securing each rod through aligned guide openings and guide means in assembled position so that said guide panels are rigidly fixed in vertical, spaced apart relationship between said front and rear frames with said interior faces opposing each other so that opposing pairs of said rails are parallel and horizontal, and
   i. a receptacle having parallel edge portions adapted to be received upon any horizontal pair of said rails.

2. The invention according to claim 1 in which said front frame has a front opening therethrough, the width of said front opening being at least equal to the width of said receptacle.

3. The invention according to claim 1 in which said guide means are straight, longitudinal tubular guide members.

4. The invention according to claim 2 in which the guide openings in said front frame are vertically spaced on each side of said front opening, and said guide openings in said rear frame are longitudinally aligned with the guide openings in said front frame, there being an elongated rod for each guide opening in said front frame.

5. The invention according to claim 1 in which said receptacle comprises a fuel receptacle.

6. The invention according to claim 5 further comprising a food receptacle having parallel side edge portions adapted to be received on a horizontal pair of rails vertically spaced from said fuel receptacle.

7. The invention according to claim 2 further comprising a cover plate slightly larger than said front opening, holes in said cover plate, each hole being in alignment with a guide opening in said front frame for receiving one of said rods in assembled position for closing said front opening.

8. The invention according to claim 7 further comprising at least one spit opening through said cover plate, and a longitudinally aligned spit opening in said rear frame.

9. The invention according to claim 1 in which said front and rear frames have opposite side edges projecting laterally exteriorly of said guide panels, and side walls joining said side edges so that each side wall is spaced apart exteriorly of a corresponding guide panel in assembled position.

10. The invention according to claim 9 in which said side walls are joined to the side edges of said front and rear frames by interior hinge means, a bottom wall having a side edge, exterior hinge means joining the side edge of said bottom wall to the bottom edge of one of said said walls, a top wall having a side edge, exterior hinge means joining the side edge of said top wall to the top edge of said other side wall, each of said front and rear frames comprising half-sections separated along a vertical midline, exterior hinge means joining said respective half-sections along said mid-lines, whereby said stove is collapsible after said guide panels and said rods have been disassembled from said front and rear frames.

* * * * *